(12) United States Patent
Narasimhan et al.

(10) Patent No.: US 11,972,586 B2
(45) Date of Patent: Apr. 30, 2024

(54) AGILE DEPTH SENSING USING TRIANGULATION LIGHT CURTAINS

(71) Applicant: CARNEGIE MELLON UNIVERSITY, Pittsburgh, PA (US)

(72) Inventors: Srinivasa Narasimhan, Pittsburgh, PA (US); Joseph Bartels, Pittsburgh, PA (US); William L Whittaker, Pittsburgh, PA (US); Jian Wang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 240 days.

(21) Appl. No.: 17/601,780

(22) PCT Filed: Sep. 25, 2019

(86) PCT No.: PCT/US2019/052854
§ 371 (c)(1),
(2) Date: Oct. 6, 2021

(87) PCT Pub. No.: WO2020/214201
PCT Pub. Date: Oct. 22, 2020

(65) Prior Publication Data
US 2022/0207761 A1 Jun. 30, 2022

Related U.S. Application Data

(63) Continuation-in-part of application No. 16/470,885, filed as application No. PCT/US2019/021569 on
(Continued)

(51) Int. Cl.
*G06T 7/521* (2017.01)
*G01B 11/25* (2006.01)
(Continued)

(52) U.S. Cl.
CPC .......... *G06T 7/521* (2017.01); *G01B 11/2513* (2013.01); *G01S 17/48* (2013.01); *G01S 17/89* (2013.01)

(58) Field of Classification Search
CPC . G06T 7/521; G01B 11/2513; G01B 11/2518; G01B 11/2504; G01S 17/48; G01S 17/89
(Continued)

(56) References Cited

U.S. PATENT DOCUMENTS 4,621,185 A 11/1986 Brown
4,687,325 A 8/1987 Corby, Jr.
(Continued)

FOREIGN PATENT DOCUMENTS

JP H08159756 A 6/1996
JP H11132713 A 5/1999
(Continued)

OTHER PUBLICATIONS

Wang et al., Programmable Triangulation Light Curtains, 2018, ECCV 2018 LNCS, SpringerLink: https://link.springer.com/conference/eccv (Year: 2018).*
(Continued)

*Primary Examiner* — Marnie A Matt
(74) *Attorney, Agent, or Firm* — KDW Firm PLLC

(57) ABSTRACT

A method to dynamically and adaptively sample the depths of a scene using the principle of triangulation light curtains is described. The approach directly detects the presence or absence of obstacles (or scene points) at specified 3D lines in a scene by sampling the scene. The scene can be sampled sparsely, non-uniformly, or densely at specified regions. The depth sampling can be varied in real-time, enabling quick object discovery or detailed exploration of areas of interest. Once an object is discovered in the scene, adaptive light curtains comprising dense sampling of a region of the scene
(Continued)

containing the object, can be used to better define the position, shape and size of the discovered object.

20 Claims, 9 Drawing Sheets

Related U.S. Application Data

Mar. 11, 2019, now Pat. No. 11,493,634, which is a continuation-in-part of application No. 15/545,391, filed as application No. PCT/US2016/017942 on Feb. 15, 2016, now Pat. No. 10,359,277.

(60) Provisional application No. 62/920,178, filed on Apr. 17, 2019, provisional application No. 62/761,479, filed on Mar. 23, 2018, provisional application No. 62/176,352, filed on Feb. 13, 2015.

(51) Int. Cl.
  *G01S 17/48* (2006.01)
  *G01S 17/89* (2020.01)

(58) Field of Classification Search
  USPC .......................................................... 382/154
  See application file for complete search history.

(56) References Cited

U.S. PATENT DOCUMENTS

| | | | |
|---|---|---|---|
| 4,687,326 | A | 8/1987 | Corby, Jr. |
| 5,128,753 | A | 7/1992 | Lemelson |
| 5,717,390 | A | 2/1998 | Hasselbring |
| 5,852,672 | A | 12/1998 | Lu |
| 6,043,905 | A | 3/2000 | Kato |
| 6,529,627 | B1 | 3/2003 | Callari et al. |
| 6,556,307 | B1 | 4/2003 | Norita et al. |
| 7,978,928 | B2 | 7/2011 | Tan et al. |
| 8,339,616 | B2 | 12/2012 | Teodorescu |
| 8,400,494 | B2 | 3/2013 | Zalevsky et al. |
| 9,500,477 | B2 | 11/2016 | Bunel et al. |
| 9,536,320 | B1 | 1/2017 | Prince |
| 9,838,611 | B2 | 12/2017 | Haraguchi |
| 10,021,284 | B2 | 7/2018 | Wang et al. |
| 10,145,678 | B2 | 12/2018 | Wang et al. |
| 2001/0035636 | A1 | 11/2001 | Adachi |
| 2002/0014533 | A1 | 2/2002 | Zhu et al. |
| 2004/0151345 | A1 | 8/2004 | Morcom |
| 2005/0128196 | A1 | 6/2005 | Popescu |
| 2005/0219552 | A1 | 10/2005 | Ackerman |
| 2006/0132752 | A1 | 6/2006 | Kane |
| 2007/0242872 | A1 | 10/2007 | Rudin et al. |
| 2007/0268398 | A1 | 11/2007 | Raskar |
| 2008/0118143 | A1 | 5/2008 | Gordon |
| 2008/0123939 | A1 | 5/2008 | Wieneke |
| 2009/0066929 | A1 | 3/2009 | Tropf |
| 2009/0201486 | A1 | 8/2009 | Cramblitt et al. |
| 2010/0046801 | A1 | 2/2010 | Ishiyama |
| 2010/0074532 | A1 | 3/2010 | Gordon et al. |
| 2010/0085425 | A1 | 4/2010 | Tan |
| 2010/0128221 | A1 | 5/2010 | Muller et al. |
| 2010/0303299 | A1 | 12/2010 | Cho et al. |
| 2011/0071675 | A1 | 3/2011 | Wells |
| 2011/0102763 | A1 | 5/2011 | Brown et al. |
| 2011/0235018 | A1 | 9/2011 | Mori et al. |
| 2011/0292347 | A1 | 12/2011 | Zhang et al. |
| 2011/0299135 | A1 | 12/2011 | Takabatake |
| 2011/0317005 | A1 | 12/2011 | Atkinson |
| 2012/0008128 | A1 | 1/2012 | Bamji |
| 2012/0062705 | A1 | 3/2012 | Ovsiannikov et al. |
| 2012/0062963 | A1 | 3/2012 | Gillham et al. |
| 2012/0200829 | A1 | 8/2012 | Bronstein et al. |
| 2013/0010087 | A1 | 1/2013 | Nieten et al. |
| 2013/0021474 | A1 | 1/2013 | Taylor et al. |
| 2013/0121560 | A1 | 5/2013 | Hirai |
| 2013/0127854 | A1 | 5/2013 | Shpunt et al. |
| 2013/0250272 | A1 | 9/2013 | Ludwig |
| 2014/0002610 | A1 | 1/2014 | Xi |
| 2014/0022251 | A1* | 1/2014 | Aila .................. G06T 15/06 345/426 |
| 2014/0055771 | A1 | 2/2014 | Oggier |
| 2014/0055779 | A1 | 2/2014 | Enami |
| 2014/0111616 | A1 | 4/2014 | Blayvas |
| 2014/0125775 | A1 | 5/2014 | Holz |
| 2014/0211193 | A1 | 7/2014 | Bloom |
| 2014/0232566 | A1 | 8/2014 | Mimeault et al. |
| 2014/0247323 | A1 | 9/2014 | Griffis et al. |
| 2014/0253724 | A1 | 9/2014 | Yamagata et al. |
| 2014/0327746 | A1 | 11/2014 | Dubois |
| 2014/0328535 | A1 | 11/2014 | Sorkine-Hornung |
| 2015/0067929 | A1 | 3/2015 | Blanton et al. |
| 2015/0176977 | A1 | 6/2015 | Abele et al. |
| 2015/0177506 | A1 | 6/2015 | Nishiwaki |
| 2015/0215547 | A1 | 7/2015 | Muller |
| 2015/0229915 | A1* | 8/2015 | Kirk .................. H04N 5/33 348/51 |
| 2015/0253428 | A1 | 9/2015 | Holz |
| 2015/0281671 | A1 | 10/2015 | Bloom et al. |
| 2015/0285618 | A1 | 10/2015 | Haraguchi |
| 2015/0285625 | A1 | 10/2015 | Deane |
| 2015/0294496 | A1 | 10/2015 | Medasani et al. |
| 2015/0362698 | A1 | 12/2015 | Lansel |
| 2015/0381962 | A1 | 12/2015 | Song |
| 2016/0041266 | A1 | 2/2016 | Smits |
| 2016/0065945 | A1 | 3/2016 | Yin et al. |
| 2016/0124203 | A1 | 5/2016 | Ryu |
| 2016/0182788 | A1 | 6/2016 | Wan |
| 2016/0182889 | A1 | 6/2016 | Olmstead |
| 2016/0198147 | A1 | 7/2016 | Waligorski et al. |
| 2016/0209183 | A1 | 7/2016 | Bakken et al. |
| 2016/0307325 | A1 | 10/2016 | Wang |
| 2016/0335778 | A1 | 11/2016 | Smits et al. |
| 2016/0349369 | A1 | 12/2016 | Lee et al. |
| 2017/0064235 | A1 | 3/2017 | Wang et al. |
| 2017/0127036 | A1 | 5/2017 | You et al. |
| 2017/0142406 | A1 | 5/2017 | Ovsiannikov et al. |
| 2017/0272726 | A1 | 9/2017 | Ovsiannikov |
| 2017/0310948 | A1 | 10/2017 | Pei et al. |
| 2017/0353707 | A1 | 12/2017 | Wang et al. |
| 2017/0366801 | A1 | 12/2017 | Horesh |
| 2018/0246189 | A1 | 8/2018 | Smits |
| 2018/0252800 | A1 | 9/2018 | Morcom |
| 2018/0307310 | A1 | 10/2018 | Mccombe et al. |
| 2018/0374230 | A1 | 12/2018 | Narasimhan |
| 2019/0025986 | A1 | 1/2019 | Yamauchi |
| 2019/0236796 | A1 | 8/2019 | Blasco Claret et al. |

FOREIGN PATENT DOCUMENTS

| | | |
|---|---|---|
| JP | 2002039716 A | 2/2002 |
| JP | 2004150810 A | 5/2004 |
| JP | 2010203864 A | 9/2010 |
| JP | 2012168049 A | 9/2012 |
| JP | 2013050310 A | 3/2013 |
| JP | 2015513825 A | 5/2015 |
| JP | 2016091006 A | 5/2016 |
| WO | 03016982 A2 | 2/2003 |
| WO | 2015003108 A1 | 1/2015 |
| WO | 2015119872 A1 | 8/2015 |
| WO | 2016131036 A1 | 8/2016 |
| WO | 2018136709 A1 | 7/2018 |

OTHER PUBLICATIONS

J. Bartels, J. Wang, W. Whittaker and S. Narasimhan, "Agile Depth Sensing Using Triangulation Light Curtains," 2019 IEEE/CVF International Conference on Computer Vision (ICCV), Seoul, Korea (South), 2019, pp. 7899-7907, doi: 10.1109/ICCV.2019.00799 (Year: 2019).*

(56) References Cited

OTHER PUBLICATIONS

S. J. Koppal and S. G. Narasimhan, "Novel Depth Cues from Uncalibrated Near-field Lighting," 2007 IEEE 11th International Conference on Computer Vision, Rio de Janeiro, Brazil, 2007, pp. 1-8, doi: 10.1109/ICCV.2007.4408900. (Year: 2007).*
European Search Report and Written Opinion for Application No. EP19924858, dated Nov. 24, 2022, 9 pages.
Extended European search report for EP Application No. 18742111.0, dated Jul. 10, 2020, 6 pages.
International Search Report and Written Opinion for International application No. PCT/US2018/014369, dated Apr. 26, 2018, 8 pages.
Communication pursuant to Article 94(3) EPC for European Patent Application No. 18742111.0, dated Dec. 16, 2021, 5 pages.
Extended European search report for Application No. EP19772623.5, dated Oct. 22, 2021, 7 pages.
International Search Report and Written Opinion for International Application No. PCT/US2019/21569, dated May 24, 2019.
Achar, S., et al., "Epipoiar Time-of-Flight Imaging", ACM Transactions on Graphics, 36(4):37:1-37:2, Jul. 4, 2017.
Wang, J., et al., "Programmable Triangulation Light Curtains", ECCV Computer Vision Foundation, [online] <URL: http://openaccess.thecvl.com/content_ECCV_2018/papers/Jian_Wang_Programmable_Lght_Curtains_ECCV_2018_paper.pdf>, pp. 1-14 (2018).
O'Toole, M., et al., "Homogeneous Codes for Energy-Efficient Illumination and Imaging" (2015).
Tadano, R., et al., "Depth Selective Camera: A Direct, On-chip, Programmable Technique for Depth Selectivity in Photography", IEEE International Conference on Computer Vision (2015).
Blais, F., "Review of 20 Years of Range Sensor Development", Journal of Electronic Imaging, 13(1): 231-240, Jan. 2004.
Heckman, P. J., "Underwater Range Gated Photography", Proc. SPIE 0007, Underwater Photo Optics I, Jun. 1, 1966, [online] https://www.spiedigitallibrary.org/conference-proceedings-of-spie on Jan. 28, 2019.
Jarvis, R. A., "A Perspective on Range Finding Techniques for Computer Vision", IEEE Transactions on Pattern Analysis and Machine Intelligence, vol. PAMI-5, No. 2, pp. 122-139, Mar. 1983.
Barry, A.J., et al, "Pushbroom Stereo for High-Speed Navigation in Cluttered Environments", IEEE International Conference on Robotics and Automation (ICRA), pp. 3046-3052, (2015).
International Search Report and Written Opinion for International Patent Application No. PCT/US16/17942, dated May 19, 2016.
International Preliminary Report on Patentability for International Patent Application No. PCT/US16/17942, dated Aug. 15, 2017.
O'Toole et al. "3D Shape and Indirect Appearance by Structured Light Transport." University of Toronto. 2014 (2014), pp. 1-3, 6-7 [on line] <URL: http://www.cs.toronto.edu/-kyros/pubs/14.cvpr.slt.pdf>.
O'Toole et al. "Prima-Dual Coding to Probe Light Transport." ACM. 2012 (2012), pp. 39:1-39:6 [online] <URL:http://www.cs.toronto.edu/-kyros/pubs/12.sig.pdc.pdf>.
International Search Report and Written Opinion for International application No. PCT/US19/052854 dated Jul. 15, 2020, 9 pages.
S. B. Gokturk, H. Yalcin and C. Bamji, "A Time-of-Flight Depth Sensor—System Description, Issues and Solutions," 2004 Conference on Computer Vision and Pattern Recognition Workshop, Washington, DC, USA, 2004, pp. 35-35, doi: 10.1109/CVPR.2004.291. (Year: 2004).
Horaud et al "An overview of depth cameras and range scanners based on time-of-flight technologies" Machine Vision and Applications—arXiv:2012.06772 [cs.CV] (2016).

* cited by examiner (B)

(A)  (B)

AGILE DEPTH SENSING USING TRIANGULATION LIGHT CURTAINS

RELATED APPLICATIONS

This application is a national phase filing under 35 U.S.C. § 371 claiming the benefit of and priority to International Patent Application No. PCT/US2019/052854, filed on Sep. 25, 2019, which is a continuation-in-part of U.S. patent application Ser. No. 16/470,885, which is a national phase filing under 35 U.S.C. § 371 claiming the benefit of and priority to International Patent Application No. PCT/US2019/021569, filed on Mar. 11, 2019, which claims the benefit of U.S. Provisional Patent Application Ser. No. 62/761,479, filed Mar. 23, 2018. Further, U.S. patent application Ser. No. 16/470,885 is a continuation-in-part of U.S. patent application Ser. No. 15/545,391, which is a national phase filing under 35 U.S.C. § 371 claiming the benefit of and priority to International Patent Application No. PCT/US2016/017942, filed on Feb. 15, 2016, which claims the benefit of U.S. Provisional Patent Application Ser. No. 62/176,352, filed Feb. 13, 2015. Further, this application also claims the benefit of U.S. Provisional Patent Application Ser. No. 62/920,178, filed Apr. 17, 2019. The entire contents of these applications are incorporated herein by reference in their entirety.

GOVERNMENT INTEREST

This invention was made with government support under contracts HR0011-16-C-0025, awarded by the Defense Advanced Research Projects Agency (DARPA) and CNS-1446601, awarded by the National Science Foundation (NSF). The government has certain rights in the invention.

BACKGROUND OF THE INVENTION 3D sensors play an important role in the deployment of many autonomous systems, including field robots and self-driving cars. However, there are many tasks for which it may not be necessary to use a full-blown 3D scanner. As an example, a self-guided vehicle on a road or a robot in the field does not need a full-blown 3D depth sensor to detect potential collisions or monitor its blind spot. Instead, what is necessary is for the vehicle to be able to detect if any object comes within a pre-defined perimeter of the vehicle to allow for collision avoidance. This is a much easier task than full depth scanning and object identification.

Depth sensors like LIDARs and the Microsoft Kinect® use a fixed depth acquisition strategy that is independent of the scene of interest. Due to the low spatial and temporal resolution of these sensors, this strategy can undersample parts of the scene that are important, for example, small and/or fast-moving objects, or oversample areas that are not informative for the task at hand, for example, a fixed planar wall.

A light curtain is a safety device that detects nearby obstacles (e.g, a human) to stop the operation of a machine. They can be used, for example, in garage doors and/or elevators to stop the doors from closing when an extended hand blocks them or on factory floors around dangerous machinery. Light curtains operate on a simple principle that an obstacle is detected when it obstructs the line of sight between a source and a sensor. Even though they are simple, light curtain systems must be specifically customized for each machine and task, hindering their broad use for vision and robotics.

Recently, this principle has been extended to generate light curtains of any shape (i.e., a ruled surface) using a line sensor and a line source. Here, an obstacle is detected when it intersects both the plane of illumination generated from the line light source and the imaging plane captured by the line sensor. In some examples, the illumination and imaging planes are rotated using steerable mirrors at different velocities to sweep out an arbitrary ruled curtain surface in 3D. Such triangulating light curtains can be highly flexible and can be useful for obstacle detection and avoidance for autonomous navigation. Such light curtains are described in related U.S. patent application Ser. No. 16/470,885, entitled "Programmable Light Curtains", of which this application is a continuation-in-part.

SUMMARY OF THE INVENTION

A method and system to dynamically and adaptively sample the depths of a scene using the principle of triangulation light curtains is disclosed herein. The method directly detects the presence or absence of obstacles (or scene points) at specified 3D lines. These 3D lines can be sampled sparsely, non-uniformly, or densely at specified regions. The depth sampling can be varied in real-time, enabling quick object discovery or detailed exploration of areas of interest.

These results are achieved using a novel prototype light curtain system that is based on a 2D rolling shutter camera with higher light efficiency, working range, and faster adaptation than prior art works, making it useful broadly for autonomous navigation and exploration.

A general framework for agile depth sensing for vision and robotics is developed herein. In some examples, the triangulation light curtain intersects the scene along 3D lines. Thus, instead of capturing 3D data of the scene in the entire volume of interest (using say, a LIDAR or Kinect®, this framework allows the flexible sampling of the depths along 3D lines in a scene over time. The depth sampling detects the presence or absence of obstacles (or scene points) at these locations in real-time without additional computation.

The depth sampling could be sparse, non-uniform (including random), or dense at specified 3D surfaces. The sparse sampling can be used to adaptively increase the spatial density of the depths in the regions of interest as specified by an application. In some embodiments, the sparse sampling can be used to adaptively increase the spatial density of the depths in only the regions of interest. Alternatively, objects in the scene can be discovered quickly by initial random sampling followed by adaptive sampling of depths. The depth sampling can be rapidly varied over time, depending on the task at hand.

This sensing framework has several advantages over depth sensing that uses a fixed acquisition strategy independent of the scene. First, it is possible to capture small, thin, and fast-moving objects that are typically difficult for low frequency uniform angular resolution LIDAR, or low spatial resolution Kinect®-like sensors to detect. Examples of such objects include thin wires, meshes or balls thrown at high speed.

The fast and dense 3D capture of objects (e.g. pedestrians) far away from the sensor is possible with the system of the invention, even when the objects are barely visible in a LIDAR point cloud, allowing for better detection, recognition and tracking of such objects. The framework also allows a robot to explore a region of interest based on initial sparse depth estimates. By continuously and sparsely sampling the scene as the robot moves, it is possible to simultaneously detect obstacles and map the 3D scene.

To achieve these results, a novel design for triangulation light curtains that uses a 2D camera and a laser line is disclosed. The rolling shutter of the 2D camera and the rotating laser line triangulate at a set of 3D lines in the scene forming a light curtain. By controlling the pixel clock and steering the source mirror, it is possible to generate arbitrary ruled surfaces as in U.S. Ser. No. 16/470,885. However, the use of a rapid 2D rolling shutter sensor provides significant advantages over the line sensor design. In some aspects, the light curtains have a refresh rate of 60 fps, a 10× improvement over the prior art design, allowing the curtains to be changed rapidly and adaptively. In other aspects, the described system is more light-efficient and achieves similar range with less collected light because the optics in front of a 2D sensor are not limited by the size of a steering mirror. In yet other aspects, the described system has fewer moving parts and is more reliable. The described system of triangulation light curtains and depth sampling works outdoors at ranges up to 20-30 m and indoors at up to 50 m. A method to suppress ambient illumination (including sunlight) is also proposed as an aspect of the described embodiments.

The described system enables real-time adaptation for agile depth sensing tasks ranging from human robot interaction, to robot manipulation, path planning and navigation. The system can be reconfigurable and can greatly impact robotics and manufacturing applications.

DETAILED DESCRIPTION

Light curtains can be imaged by steering a line imager with a galvomirror, but the nature of that design can limit the frame rate to 5.6 fps and may require the use of a small lens to fit the line sensor's field-of-view onto the rotating galvomirror. This may reduce its light efficiency and range. Both of these issues can be improved by using a 2D camera and larger aperture lens to image the light curtains.

Figure 1:
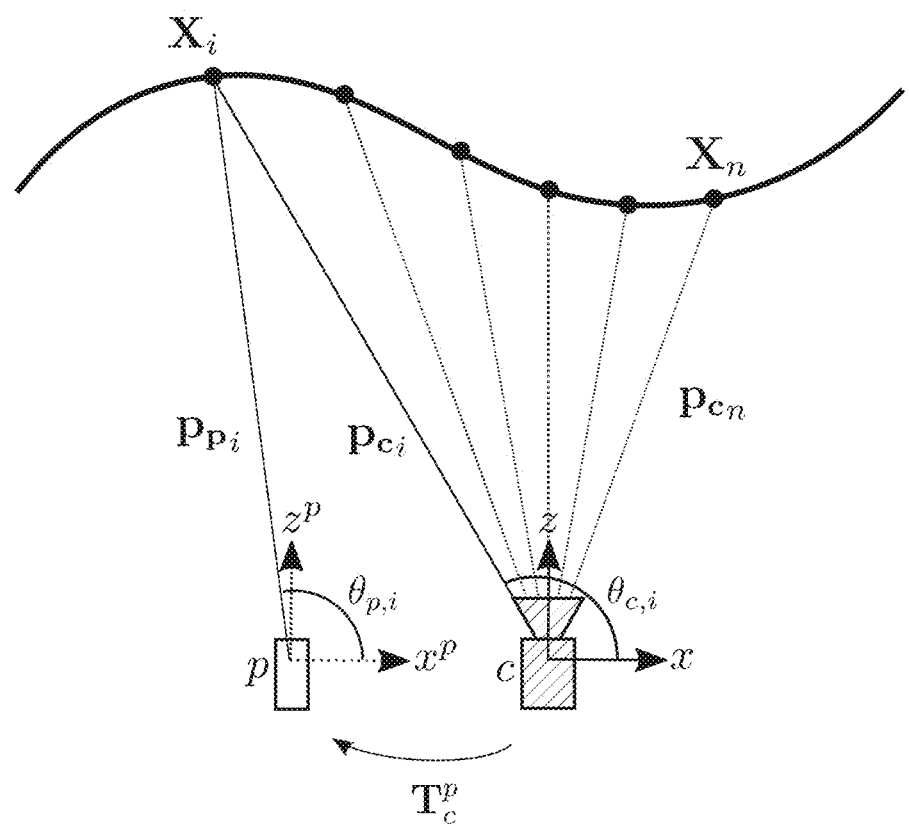
FIG. 1 schematically shows a top-view of the planar-parallel geometry of a triangulation light curtain using 2D cameras.

Instead of the continuous scanning of a single line sensor plane, a 2D camera can have a discrete set of imaging planes that are defined by the optics and pixel array. In at least some designs of a light curtain, the intersection of the pixels on these planes and the light curtain surface can be found. For simplicity of design, in some embodiments, it can be assumed that the pixel rays of a given camera column are co-planar and that the light sheet projector emits a true plane of light and that its rotation axis is parallel to columns of the camera. These assumptions can be generally enforced by using a low distortion lens, careful design of the light sheet projector optics, and precise alignment of the projector axis to the camera columns. With these assumptions, light curtains can be designed in two-dimensions by looking at the rays on the XZ-plane, as shown in FIG. 1. Given that a 3D point, $X_i$ is on the intersection of the camera plane, $p_{c_i}$, and the desired curtain surface. The required projected light plane, $p_{p_i}$, and angle, $\theta_{p,i}$, to image that point can be found through simple geometry by creating a plane from $X_i$ and two points that lie on the camera plane's rotation axis (e.g. (0, 0, 0) and (0, 1, 0)). As the camera plane changes (as indicated by the faint lines), the required light planes are calculated for each new point. The required laser plane may be found in a similar manner by first projecting $X_i$ into the frame of the projector to get:

$$X_i^P = T_c^P X_i \quad (1)$$

where $T_c^P$ is the transformation matrix that converts points in the camera frame to the projector frame found through calibration.

The point $X_i^P$ is then used with two points on the projector rotation axis to find the projected light plane, $p_{p_i}^P$, which is in the frame of the projector. This plane in the camera frame is then found by Eq. (2):

$$p_{p_i} = T_c^{P\perp} p_{p_i}^P \quad (2)$$

Figure 2:
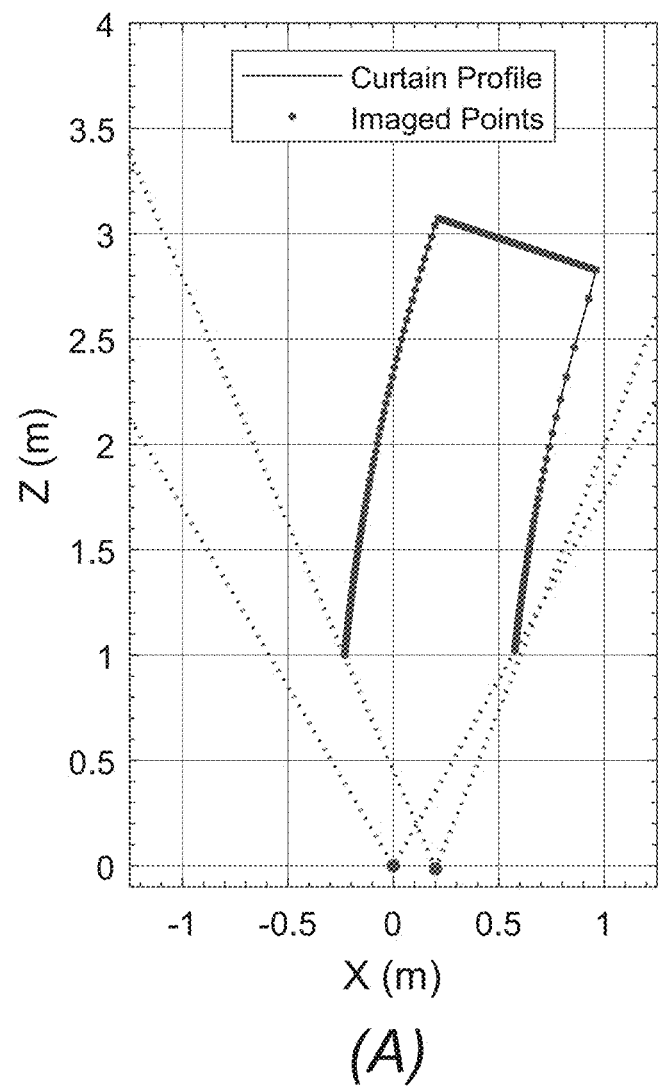
FIG. 2 shows a light curtain design with 2D cameras.
Figure 2:
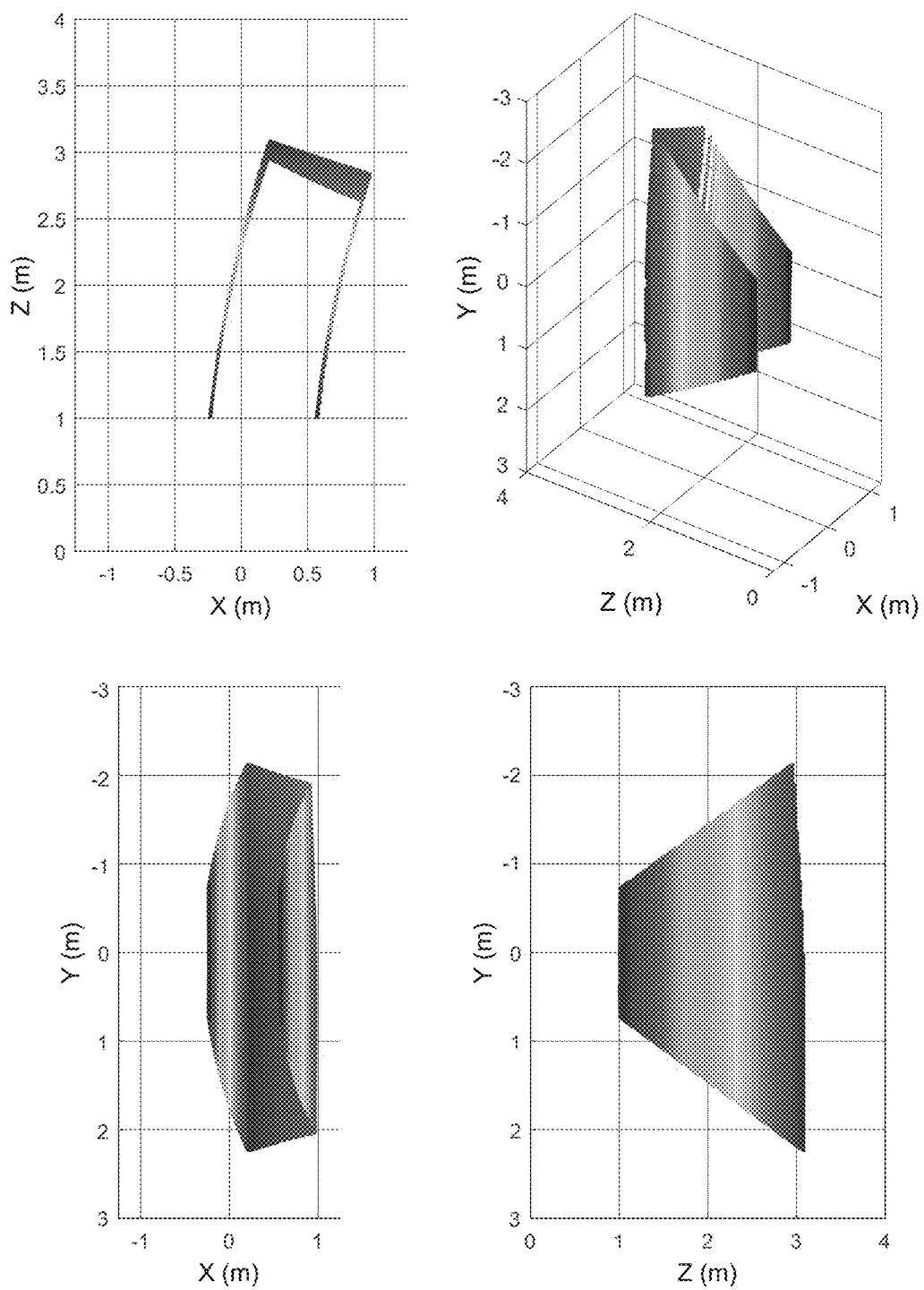

To image a curtain profile, the desired profile is first discretized into a series of m points uniformly distributed along the curtain profile, where m is approximately the number of columns of the camera. Line segments are then formed between adjacent points. The ray representing each column is then checked for intersection with the line segments to produce a series of points, $X_i \ldots X_n$ on the column rays that lie on the light curtain profile, as shown in FIG. 2. It is possible that some of the camera rays will not intersect the desired curtain profile or that the design points will be outside the field-of-view of the light sheet projector or camera. Any points that lie outside the field-of-view of either module may be marked invalid and not used to image the light curtain. If the design point is valid, it is transformed into the frame of the light sheet projector using Eq. (1) and the galvomirror angle needed to create a light sheet that will travel through the design point is calculated using Eq. (3):

$$\theta_{p,i} = a\tan 2(x_{z,i}^P, x_{x,i}^P) \quad (3)$$

For an ideal system with true planes of illumination and imaging, the 3D points of the surface can be defined by the intersection line of the two planes. However, for a real system, the lens may have a small amount of distortion and there may be some small alignment error between the camera and light sheet projector. In this manner, the true points of intersection with the light sheet plane for pixels in a given column may not be co-planar and can be found by calculating the intersection of each pixel ray with the light sheet plane, using known calculation methods for ray-plane intersection. This means that the actual 3D surface of the light curtain can vary from the designed profile throughout the camera field of view as shown in FIG. 2. View (A) shows light curtains designed with a 2D camera by finding the points at the intersection of the camera rays with the desired curtain profile. This produces a non-uniformly spaced set of points on the curtain surface. Due to small optical distortion and alignment error, the actual 3D profile of the curtain is not a perfect extrusion of the designed curtain into 3D, as shown by the difference in curtain shape along each axis in View (B). For example, note the varying depth of the front of the curtain in the z-axis. However, depending on the severity of the distortion and misalignment, the curtain profile may be fairly consistent towards the middle of the field-of-view and only changes significantly towards the edges of the field-of-view.

Fast Curtain Imaging with Rolling Shutter Cameras

Light curtain imaging can require the imaging plane to change and intersect the light curtain surface where desired. For a 2D camera, this can be done by capturing an entire frame and only using a given column (slow) or by only imaging a select region-of-interest on the imager (faster, but still slow). Although simple to implement, both of these methods may be too slow to enable agile light curtain imaging.

A much quicker method of imaging the curtain can involve using the rolling shutter of a 2D CMOS imager to move the imaging plane. The rolling shutter can change the imaging plane rapidly at a uniform speed specified by the pixel clock of the imager. This characteristic can enable light curtain imaging at the full frame rate of the rolling shutter camera. Imaging a curtain can be as simple as commanding the light sheet projector to the angle necessary to project the light sheet at the point defined by the intersection of the active row of the 2D camera and the light curtain profile. By synchronizing the motion of the rolling shutter with the motion of the light sheet, light curtains forming any ruled surface can be imaged.

For each frame of the rolling shutter camera, an image of the captured curtain can be produced. While imaging light curtains, the camera captures both laser light and ambient light. If the ambient light is low enough, (i.e. indoor imaging), the image from the camera can be directly thresholded to produce a mask indicating the detected points. However, in many circumstances the captured ambient light is much greater than the captured laser light and the curtain cannot be detected (i.e. outdoors in sunlight). A narrow band-pass filter significantly reduces the captured ambient light, but for maximum performance it is desirable to detect the laser signal at as few bits as possible.

Ambient Subtraction

To increase the performance in the presence of ambient light, ambient light may be subtracted by capturing both an ambient image and a combined laser+ambient image at each light curtain position. In this example, the ambient image is subtracted from the combined image to get an image with just the curtain light. This allows for greater ambient performance but requires that the same camera plane be imaged twice. This can be done with a 2D camera if the entire image or a selectable region of interest is being imaged, but in some instances may not be done with a single rolling shutter frame capture. To solve this, a method of the present invention, in some embodiments, uses adjacent columns of a captured image to perform ambient subtraction.

Figure 3:
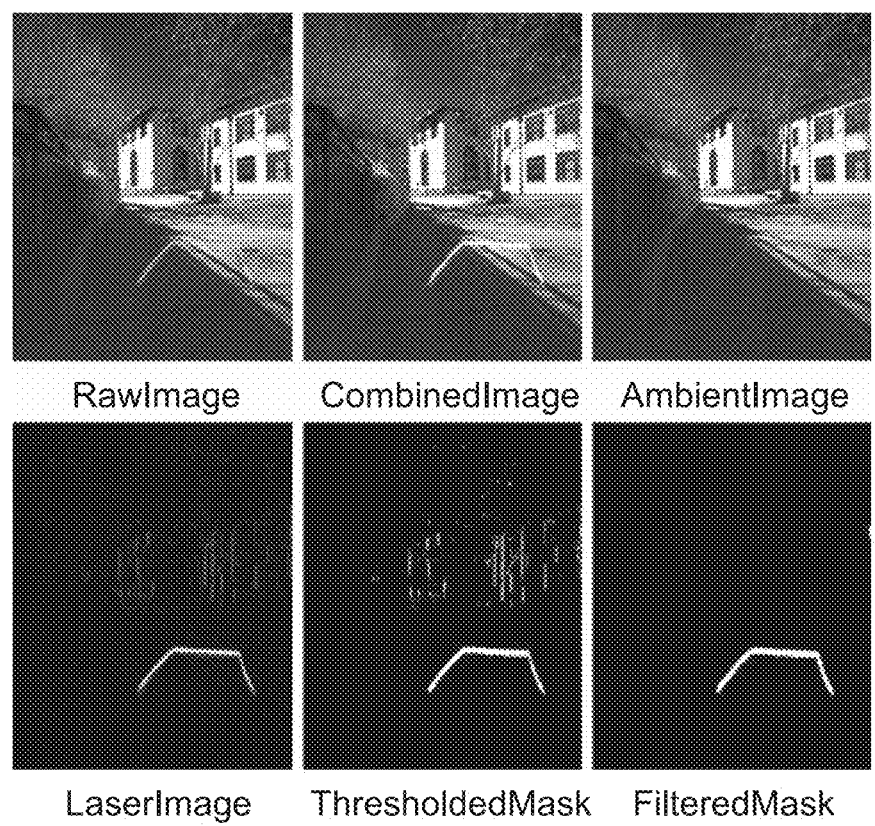
FIG. 3 shows the results of a method of ambient light suppression.

The method may sacrifice curtain resolution and may capture a raw image where even columns are captured with the laser on and odd columns with the laser off to get an ambient-only image and a combined image, as shown in FIG. 3. Separating these columns and upsampling them forms a full resolution ambient-only image and a combined image. Subtracting the ambient image from the combined image produces a laser-only image, which can then be thresholded to find the light curtain detections, providing a mask indicating the imaged detection points. Filtering this mask with a thin horizontal erosion/dilation filter provides improved robustness to large intensity gradients and upsampling artifacts.

In areas of high ambient light, this technique may still produce errors at locations of high intensity gradient as shown by the faint edges in the laser image and vertical thin lines in the thresholded mask image in FIG. 3.

Depending on the synchronization precision of the rolling shutter motion with the motion and timing of the light sheet projector, there may be slight bleed-through of the laser light onto neighboring columns which may show up in the ambient image. Because this light may appear in the ambient image, it can be subtracted from the combined image and the measured signal from the laser light can be reduced, thereby reducing the performance of the device. With a precise synchronization, the amount of this light can be limited to a few bits or removed altogether, so that it does not greatly affect the performance of the system.

Limitations

In some embodiments, in exchange for the imaging speed and enhanced light efficiency of using a rolling shutter camera, the uniform sampling of the light curtain profile that dual galvomirrors provides prior art designs may be surrendered due to the discrete nature of the camera pixels. This can lead to a situation where there may be a gap in the curtain profile that the light curtain device cannot image.

This may occur when the rays of the camera are similar in direction to the curtain surface. This effect is shown in the top-right portion of the curtain profile in FIG. 2. One other disadvantage of using a rolling shutter camera may, in some examples, be that each plane of the camera can only be imaged once in a given frame. If a camera plane intersects multiple curtain segments (e.g. a zig-zag) one of the segments can be chosen for the imaged curtain and sequential curtains can be imaged to capture all the points along a given ray. One limitation of the galvomirror may be that, if it is commanded to move very quickly (greater than a 100 Hz step function), then it may lag the commanded position and the intersection of the planes will be at a point different than designed, which may in turn cause errors in the locations of the detected points. This may constrain which curtains can be imaged and, in practice, may require random and adaptive curtains to be smoothed with a spline before imaging. This error can be accounted for by using the angle measured from the closed-loop feedback of the mirror lo calculate the position of the detected points, rather than trusting open-loop control.

Hardware Prototype

A hardware prototype of the system comprises of a light sheet projector and a rolling shutter camera. The described system is exemplary only, and embodiments of the system covered by the claims are is not meant to be limited to the described components. The light sheet projector may contain a custom-designed line laser module using a 1 W 830 nm laser diode that is then collimated and shaped into a line with a 45° Powell lens. This laser line is then projected onto and steered with a galvomirror. The line laser module is aligned and mounted to the galvomirror in a mount that enables the precise collinear alignment of the laser line with the galvomirror's axis of rotation. The galvomirror may have dimensions of 14.5 mm×8.5 mm and may have a 50° optical scan angle.

The rolling shutter camera may be fitted with a low distortion C-mount lens with 70° (h)×60° (v) field of view. This camera may provide 10-bit precision and may have a native resolution of 1280×1024 pixels with 5.3 μm square pixels. The camera may be operated in 2× binned mode for a resolution of 640×512 to increase the signal of the received light and reduce the noise. A low-distortion lens may be used to ensure that the intersection of the light sheet and the camera rays along a given column form as close to a line as possible. A 12 nm bandpass filter may be placed centered at 830 nm between the lens and the image sensor to reduce the amount of collected ambient light. The camera may be aligned to the galvomirror such that the rows of the camera are parallel with the galvomirror's axis of rotation. The rotated camera may then be placed at a fixed baseline of 200 mm from the galvomirror's rotation axis. A micro-controller may be used to synchronize the camera, the laser, and the galvomirror. A color 2D helper camera may be used for visualizing the light curtains and detecting results in the scene by projecting the light curtain to its view.

In alternate embodiments, different types of sensors may be used, including, but not limited to CMOS (complementary metal oxide semiconductor), InGaAs (indium gallium arsenide), SWIR (short-wave infrared), DVS (dynamic vision sensor), ToF (time of flight) and CW-ToF (continuous wave time of flight) type sensors.

Calibration

The performance of light curtains depends on precise calibration of the camera and light sheet projector. First, the camera intrinsics may be determined. Next, the extrinsic calibration of the light sheet projector and camera may be determined by imaging a set of light planes projected by the light sheet projector onto a planar wall. A checkerboard target of known dimensions may be attached to the wall and imaged with the calibrated camera to get the known 3D coordinates of points on each imaged laser line. This may be repeated with the same set of planes at several depths to fully define each plane of light. Best fit plane equations may then be found for each set of points using weighted least squares where the weights were the normalized intensity values. Then, given the equations for the planes, the location of the galvomirror axis with respect to the camera may be found by a least squares fit of a line to the intersection of all the planes. A continuous function may be fitted to the relationship of the plane angle (with respect to the galvomirror axis) and the commanded light sheet projector angle, which is then used to determine the commanded galvomirror position needed for any speci-fied angle of a given design point.

Capture Process

In prior-art light curtain designs, the light sheet and camera plane angles were commanded by the positions of galvomirrors. With a 2D camera, however, the camera plane angle is defined by the optics and the active line of pixels on the imager. For a rolling shutter camera, the active line of pixels is defined by the speed of the rolling shutter and the time since the start of the frame. The speed of the rolling shutter is determined by the readout rate of the pixels, known as the pixel clock. The maximum time that a given line is active can be found by dividing the number of pixels on the line by the pixel clock. At the maximum 60 fps capture rate of the camera, the maximum active exposure lime of a line is ≈15 μs.

To image a light curtain, the software causes the processor to calculate the required galvomirror positions and transmit them to a micro-controller controlling the galvomirror. At the same time, the camera is triggered to start the frame capture. The software then sequentially commands the galvomirror positions and laser power in lock step with the timed progression of the rolling shutter. This process then repeats for each successive light curtain. Calculating the galvomirror positions for every frame allows for a different light curtain to be imaged every frame at the full frame rate of the camera.

Working Range

At some frame rates, the described device has a working range of 20 m while imaging a whiteboard in approximately 50 klx of ambient light and a working range of 50 m indoors. This has a reduced exposure time. When the device is configured for an exposure of 100 μs, the device can image over 40 meters outdoors in similar conditions.

Agile and Dynamic Light Curtains

Figure 4:
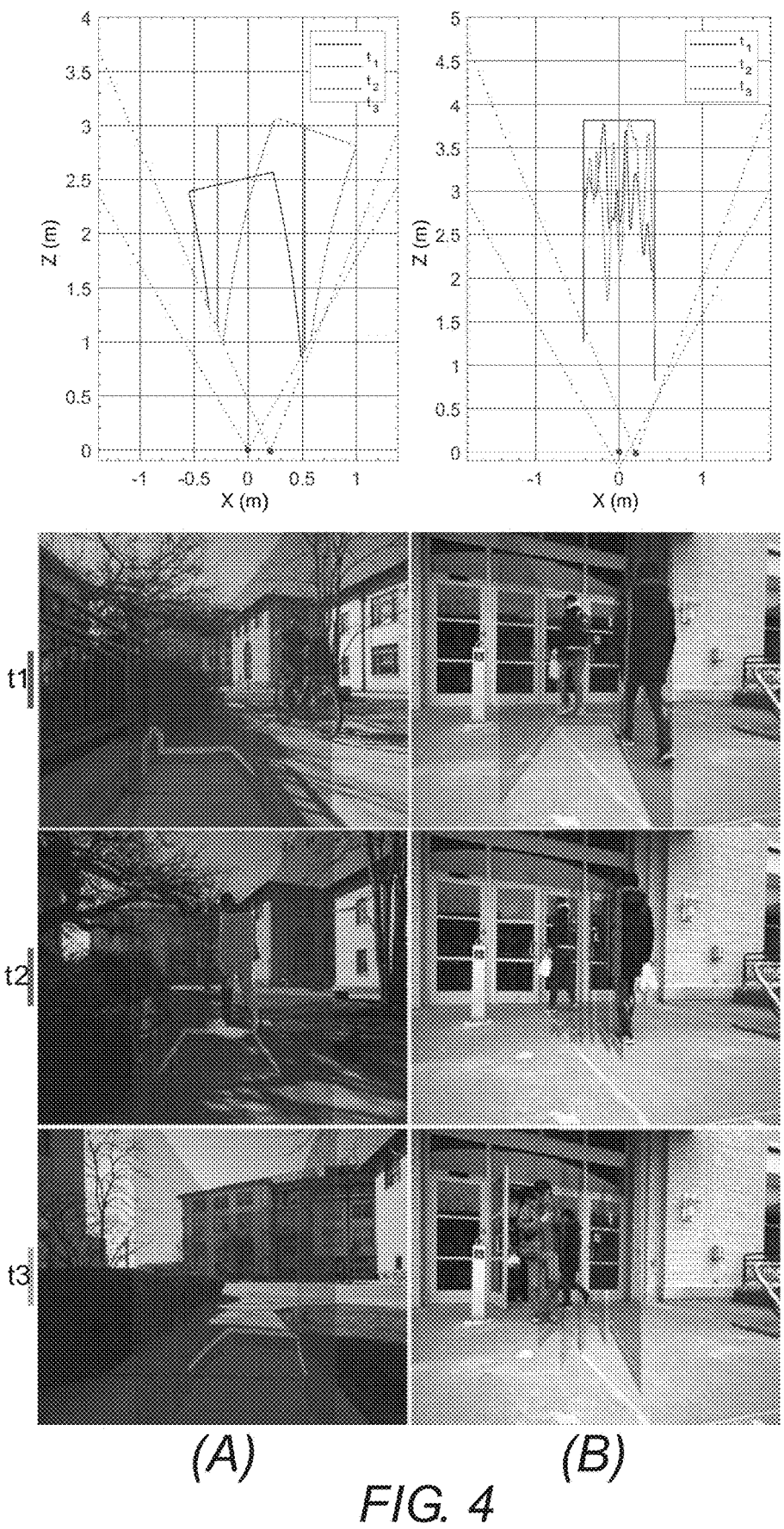
FIG. 4 shows that captured light curtains can be imaged and changed up to 60 limes per second to quickly scan different curtains through a volume.

The described device is capable of imaging 60 different light curtains per second. This speed and flexibility enables the use of agile and dynamic light curtains that can be used to intelligently and adaptively sample the scene. This capability can be applied to many areas including path planning, high-resolution safety curtains, and depth sensing. FIG. 4 shows the results of imaging various types of light curtains both indoors and outdoors and are just a sample of the different types of curtains that can be imaged with the described device. Images shown in FIG. 4 are the light curtain surface and detections projected into the helper camera's view for visualization on the scene. The images shown in FIG. 4 are from the 2D helper camera's view with the light curtain surface rendered in blue and detections rendered in green. The agile nature of these curtains enables many applications including the rapid checking of planned paths, shown in View (A), and detecting obstacles entering and within a safety zone by rapidly alternating between checking the border of the safety-zone and the area within it, shown in View (B).

Figure 5:
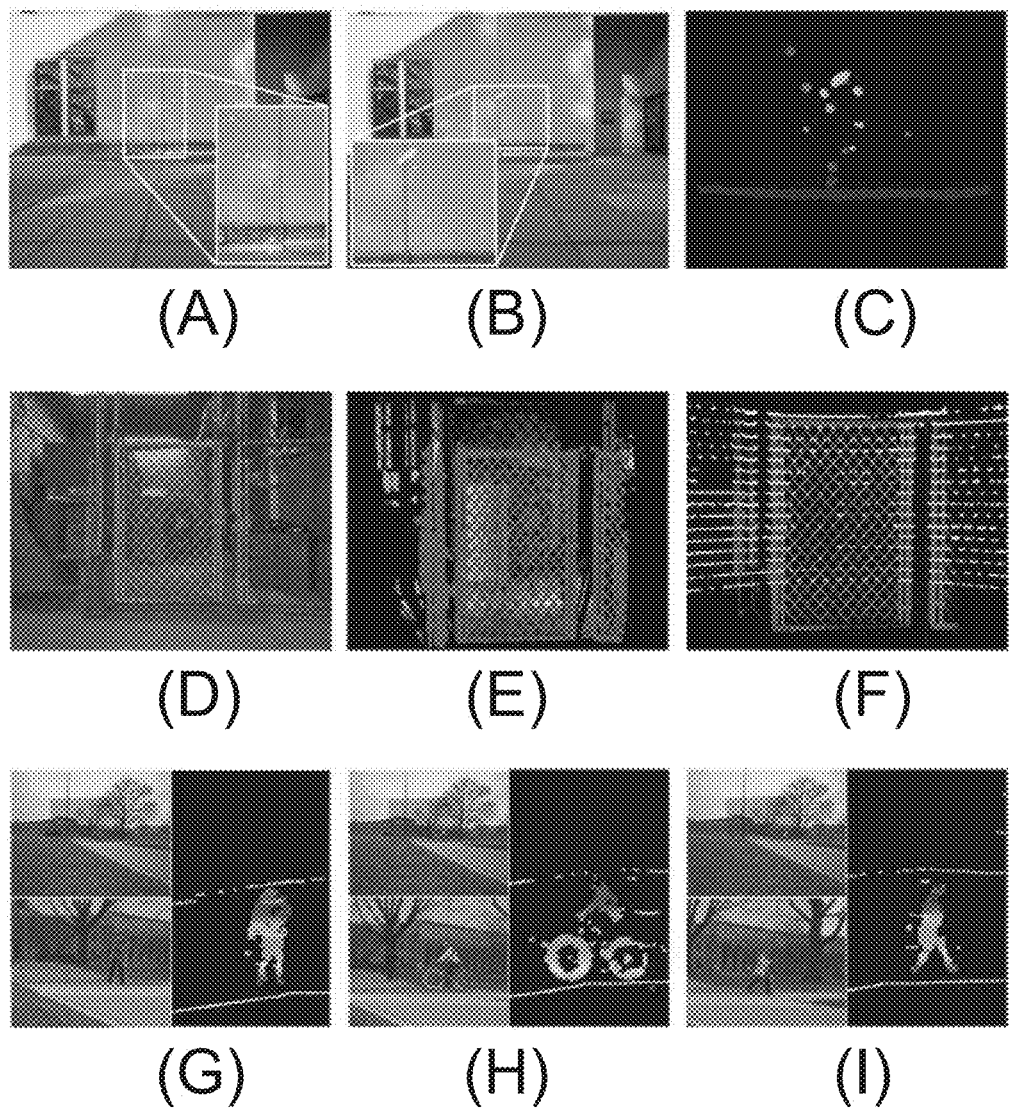
FIG. 5 shows the described device capturing the depth of small, fast objects

High-Resolution, High Speed Light Curtains:

The rapid capture rate and resolution of the described device enables the imaging of small and fast objects as they pass through light curtains, as shown in Views (A-C) of FIG. 5. Several composite images show the view and detected location of small 70 mm diameter balls in View (A) and 30 mm diameter balls and a 30 mm thick, 265 mm diameter Frisbee that was thrown through a planar curtain 5 m away in in View (B). The detections of the objects are shown in View (C). The resolution of light curtains provides increased detail over scanning LIDAR devices and can enable enhanced object recognition and critical detection of small objects (e.g. wires, branches, etc). This is especially noticeable when imaging thin structures or objects at a distance as shown in Views (D-I) of FIG. 5. Views (D-F) shows a planar curtain swept through a volume containing a thin wire fence to create a dense 3d pointcloud in View (E). The light curtain (green points) in View (F) reconstructs the fence mesh at much higher resolution than a 16-beam Velodyne VLP-16 scanning LIDAR (white points) at a distance of 1.5 m away. By imaging a planar curtain, the range and resolution of the light curtain enable it to create high resolution height maps of objects at ranges of 15 m outdoors, as shown in Views (G-I). At this range, a static VLP-16 scanning LIDAR only senses the objects as a few points, shown in white.

Adaptive Depth Imaging

Figure 6:
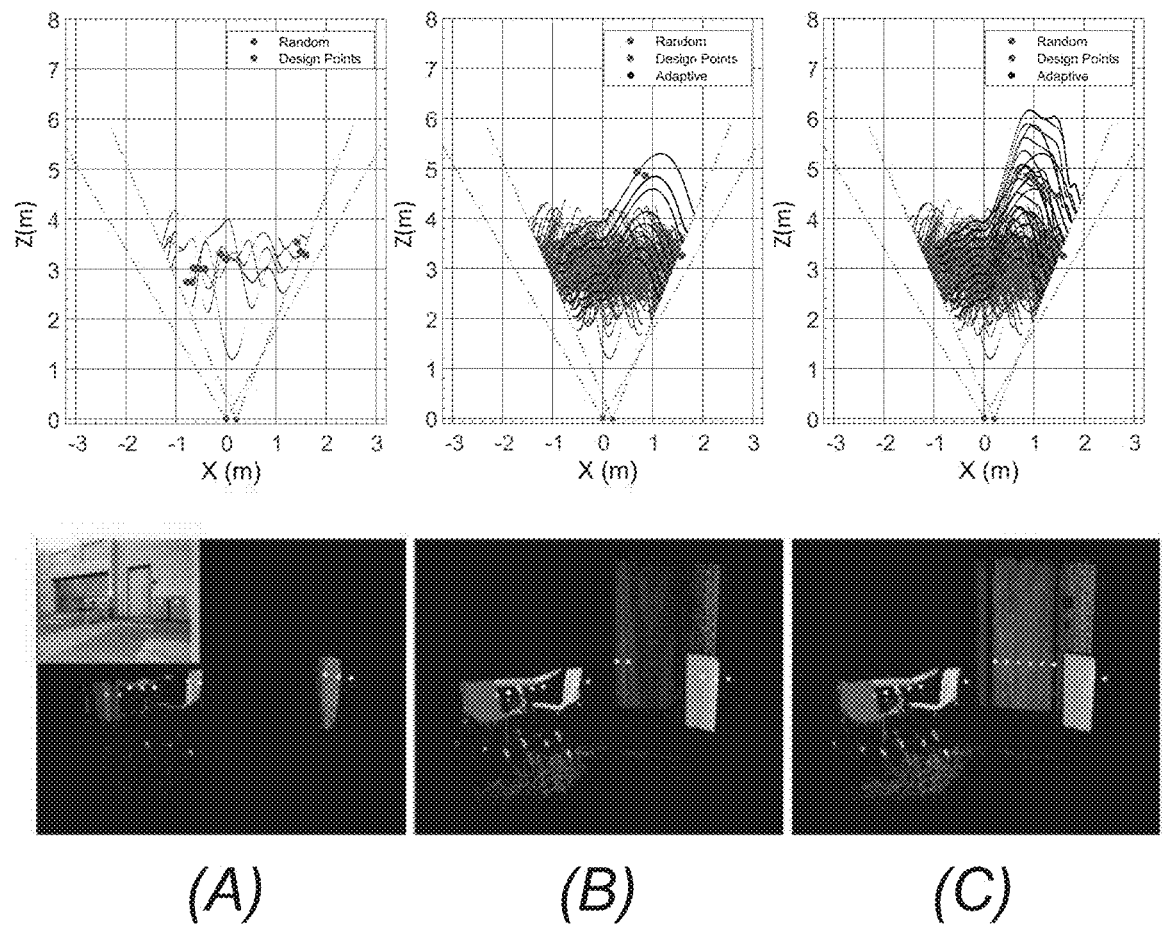
FIG. 6 shows adaptive depth imaging of a table and chairs scene.

The ability to specify depths of interest at high-rates enables intelligent depth imaging of an environment based on the current knowledge of the scene. For example, when a device first enters into the scene, it has no knowledge of the environment, but by quickly and randomly scanning a volume of interest with light curtains it can generate a coarse estimate of the locations of objects in the scene, and one or more new curtains can be designed to image around these points-of-interest. This process is then rapidly repeated to form an accurate map of the objects in the scene. FIG. 6 shows adaptive depth imaging of a scene containing a table and chair. The imaging is performed by first randomly sampling a volume of interest to find objects. Then, the detected points at the front of these objects (indicated by red dots in plots and white dots in bottom row) are used to design a set of light curtains which is then imaged to refine and discover more of the scene. As time continues, the curtains eventually discover and image the back wall of the scene. FIG. 6, View (A) shows random curtains used to initialize the curtain by randomly sampling a volume of interest within 3 m of the light curtain. These curtains detected several objects, which the device then used as design points to fit a new curtain to the front surfaces of the objects. In less than a few milliseconds, a set of 10 curtains were designed that were scaled versions of this spline to cover the area directly in front of and behind the detected scene points. These new curtains were then imaged and used to refine and discover more of the scene. By interleaving a few random curtains with the adaptive curtains, the device can continue checking the scene for any changes and sample the rest of the scene at low resolution. The design process for the experiment in FIG. 6 projected all of the detected points to the XZ-plane and used the closest point within an angular region as the design point for that region. By splitting the entire plane into these uniformly spaced angular regions, a set of design points were determined.

Depth Imaging Comparison

Figure 7:
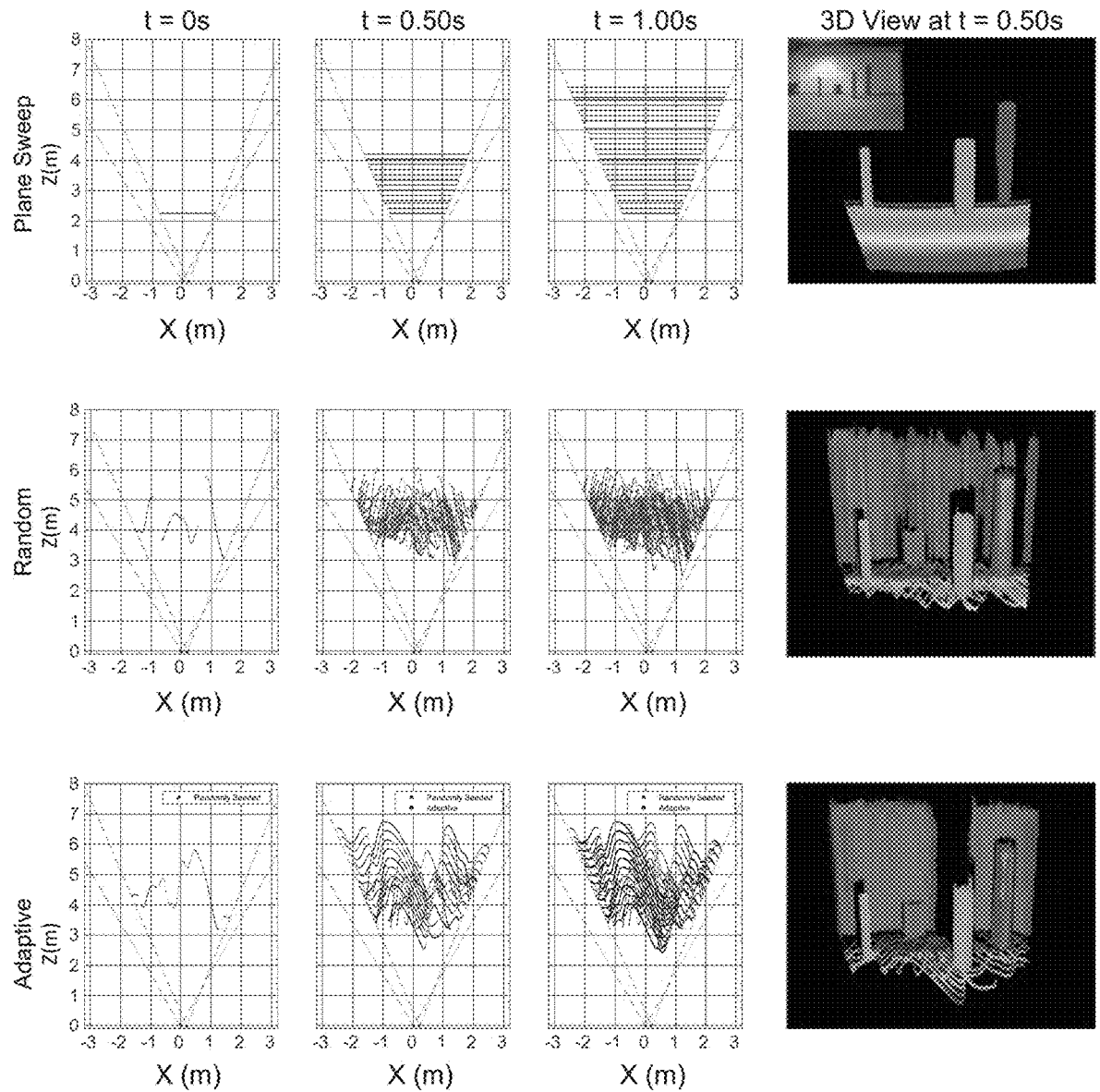
FIG. 7 shows depth imaging of a scene using planar curtains, random curtains, and adaptive curtains.

A comparison of depth imaging methods using different light curtain types was performed by capturing the same scene with each curtain type and comparing the coverage of the scene at specified times. The methods included plane sweeping, random sampling, and adaptive depth imaging. For plane sweeping, the planes were designed to fully image the 4.25 m scene in 1.0 with a depth resolution of 0.2 m. The adaptive curtains were tuned to sense the front surfaces of detected objects at a high resolution and the rest of the scene at a low resolution. FIG. 7 shows the results of this comparison. Once initialized with 0.25 s of random detections, the discovery nature of the adaptive curtain enabled it to sense near the detected objects and not waste time sensing empty areas at the front of the scene. As a result, it was able to quickly cover the interesting parts of the scene in less than 0.25 s. Given the time, plane sweep curtains can provide high-resolution and complete coverage, but with limited time, random and adaptive curtains can image more of the scene in less time. For example, the plane sweep curtains could have been configured to image the entire scene in 0.5 s but at 0.4 m depth resolution, which is much less than the other methods. FIG. 7 shows that adaptive curtains intelligently cover more of the scene in less time than sweeping a plane or random sampling of the scene. After initialization with random sampling, the adaptive curtains discovered the interesting parts of the scene in 0.25 s and then continued to refine the map.

Discovery and Mapping Using Adaptive Light Curtains

Figure 8:
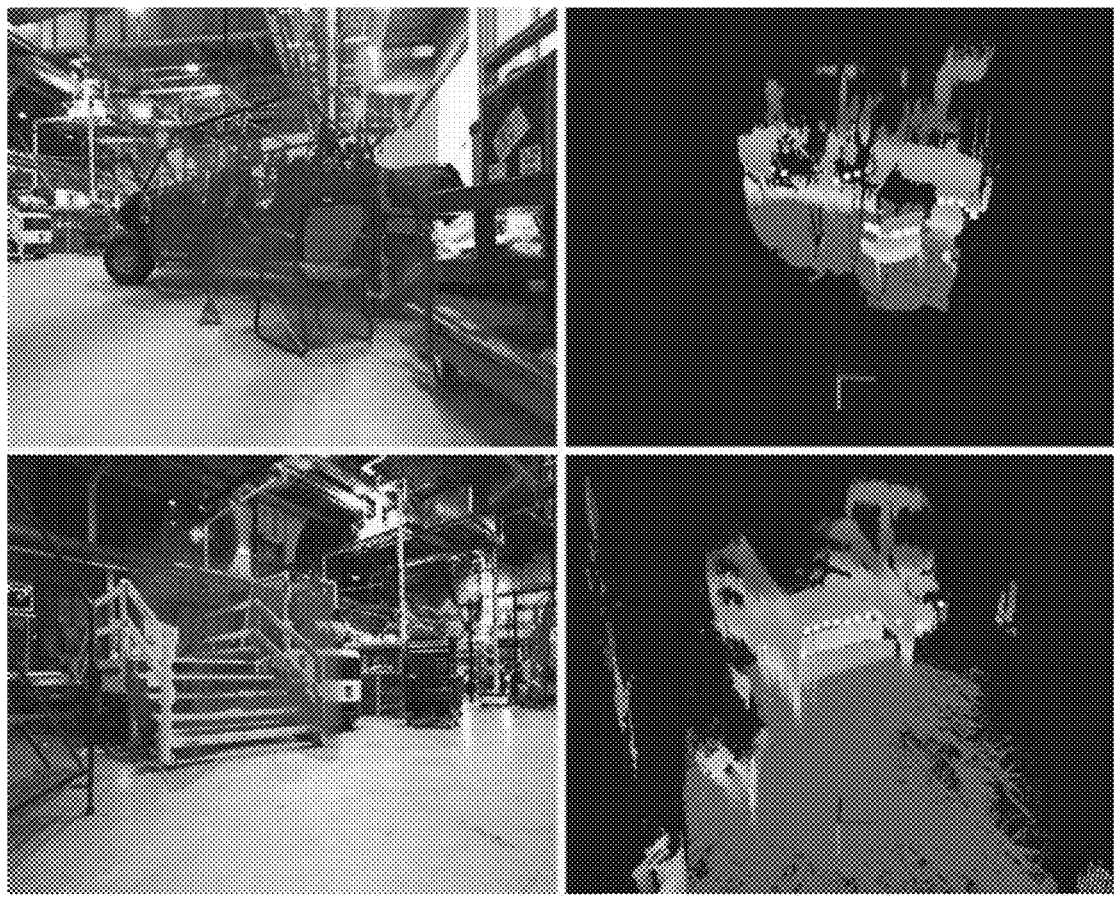
FIG. 8 shows the results of a mobile robot being driven through a highbay scene.

Adaptive light curtains can be used to discover and map a scene from a moving platform. A small robot with on-board localization was used to move the light curtain device through a cluttered highbay scene, as shown in FIG. 8. As the robot progressed through the scene, adaptive light curtains discovered the scene structure and continuously adapted to image the newly detected objects from each frame. Rather than using a fixed depth sensing strategy, the light curtains intelligently sampled regions around the detected objects at high-resolution and sampled the rest of the scene with random curtains at a lower resolution. For our mapping experiments, a set of 5 uniquely random curtains were interleaved with every 10 adaptive curtains. FIG. 8 shows a few instances of the curtains fitting to objects in the scene. Notice that the curtains, shown in blue in View (A), fit tightly around the objects in the scene. When moved throughout the environment, the detected points on the curtains, shown in green in View (B) also mapped the scene. The white points on the 3D maps show the design points for the set of adaptive curtains.

To those skilled in the art to which the invention relates, many modifications and adaptations of the invention will suggest themselves. The exemplary methods and systems disclosed herein are not to be taken as limitations on the invention, but as an illustration thereof. The intended scope of the invention is defined by the claims which follow.

We claim:

1. A system comprising:
   a light source for creating a light sheet plane;
   a line sensor having an adjustable region of interest for sensing a line in a sensing plane, the sensed line being defined by an intersection of the light sheet plane and the sensing plane;
   a processor; and
   software executed by the processor for performing the functions of:
      sampling a scene along a non-uniform plurality of sensed lines in the scene;
      discovering one or more objects in the scene at one or more of the plurality of sensed lines;
      increasing the density of the sensed lines in areas of the scene containing the one or more discovered objects to create one or more adaptive curtains of sensed lines.

2. The system of claim 1 wherein the light source comprises:
   a laser diode;
   a collimation lens;
   a Powell-type lens; and
   a steerable galvomirror;
   wherein light emitted by the laser diode is formed into a line of light by the Powell-type lens and before striking the steerable galvomirror.

3. The system of claim 1 wherein the line sensor comprises a camera having a rolling 2D shutter.

4. The system of claim 1, wherein discovering of the one or more objects comprises detecting a variance in light detected by the line sensor, indicative of the presence of an object intersecting the sensed line.

5. The system of claim 4 wherein the discovering of the one or more objects further comprises:
   determining a position and depth for each of the one or more discovered objects using triangulation based on positions of the light sheet plane and the sensing plane.

6. The system of claim 1, the non-uniform plurality of sensed lines being sparsely distributed within the scene.

7. The system of claim 1, the non-uniform plurality of sensed lines being randomly distributed within the scene.

8. The system of claim 2 wherein the camera has a pixel array comprising a plurality of columns of pixels and further wherein the rotation axis of the galvomirror is parallel to the plurality of columns of pixels.

9. The system of claim 8, the increased density of the sensed lines in areas of the scene containing the one or more discovered objects defining a light curtain profile, the light curtain profile being imaged by:
   discretizing the light curtain profile by defining a plurality uniformly distributed of points along the profile;
   calculating, for each point, an angle for the galvomirror to cause the light sheet plane to intersect the point; and
   capturing light reflected from an object intersecting a sensed line at each defined point.

10. The system of claim 9 wherein each defined point corresponds to a single column in the pixel array of the camera.

11. The system of claim 10, wherein capturing light reflected from a sensed line at each point further comprises:
calculating, for each pixel in the single column of pixels that correspond to the defined point currently illuminated by the light sheet plane, the intersection of a pixel ray with the light sheet plane.

12. The system of claim 9 further comprising, for each sensed line:
capturing a first image comprising only ambient light;
capturing a second image comprising both ambient light and illumination from the light source; and
subtracting the first image from the second image.

13. The system of claim 9 wherein the software further causes the processor to:
calculate a required galvomirror position and transmit it to a micro-controller controlling the galvomirror;
trigger the camera to start a frame capture; and
sequentially command galvomirror positions in lock step with a timed progression of the rolling shutter of the camera.

14. The system of claim 13 wherein the software further causes the processor to:
control the laser light diode with a desired laser power setting.

15. The system of claim 1 wherein one or more adaptive light curtains can be created to track one or more objects in the scene while simultaneously sampling the scene with non-uniform, sparse sensed lines.

16. A computer-implemented method comprising:
sampling a scene along a non-uniform plurality of sensed lines in the scene, each sensed line defined as an intersection of a light sheet plane and a sensing plane;
discovering one or more objects in the scene at one or more of the plurality of sensed lines;
increasing the density of the sensed lines in areas of the scene containing the one or more discovered objects to create one or more adaptive curtains of sensed lines, each adaptive curtain adapted to sense one or more of the discovered objects.

17. The method of claim 16 wherein the discovering of the one or more objects comprises:
determining a position and depth for each of the one or more discovered objects using triangulation based on positions of the light sheet plane and the sensing plane.

18. The method of claim 16, the non-uniform plurality of sensed lines being sparsely and randomly distributed within the scene.

19. The method of claim 16 further comprising, for each sensed line:
capturing a first image comprising only ambient light;
capturing a second image comprising both ambient light and illumination from the light source; and
subtracting the first image from the second image.

20. The method of claim 16 wherein one or more adaptive light curtains can be created to track one or more objects in the scene while simultaneously sampling the scene with non-uniform, sparse sensed lines.

* * * * *